S. C. Ridgaway,
HARVESTER RAKE

73388

PATENTED
JAN 14 1868

Witnesses

S. C. Ridgaway
Inventor,
by Dodge & Son
Attorneys

United States Patent Office

SAMUEL C. RIDGAWAY, OF BALTIMORE, MARYLAND.

Letters Patent No. 73,388, dated January 14, 1868.

---

IMPROVEMENT IN HARVESTER-RAKES.

---

The Schedule referred to in these Letters Patent and making part of the same.

---

TO ALL WHOM IT MAY CONCERN:

Be it known that I, SAMUEL C. RIDGAWAY, of Baltimore, in the county of Baltimore, and State of Maryland, have invented certain new and useful Improvements in Harvester-Rakes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in the method or devices for operating harvester-rakes, described in the patent granted to me on the 27th day of November, 1867, as hereinafter more fully explained.

Figure 1:
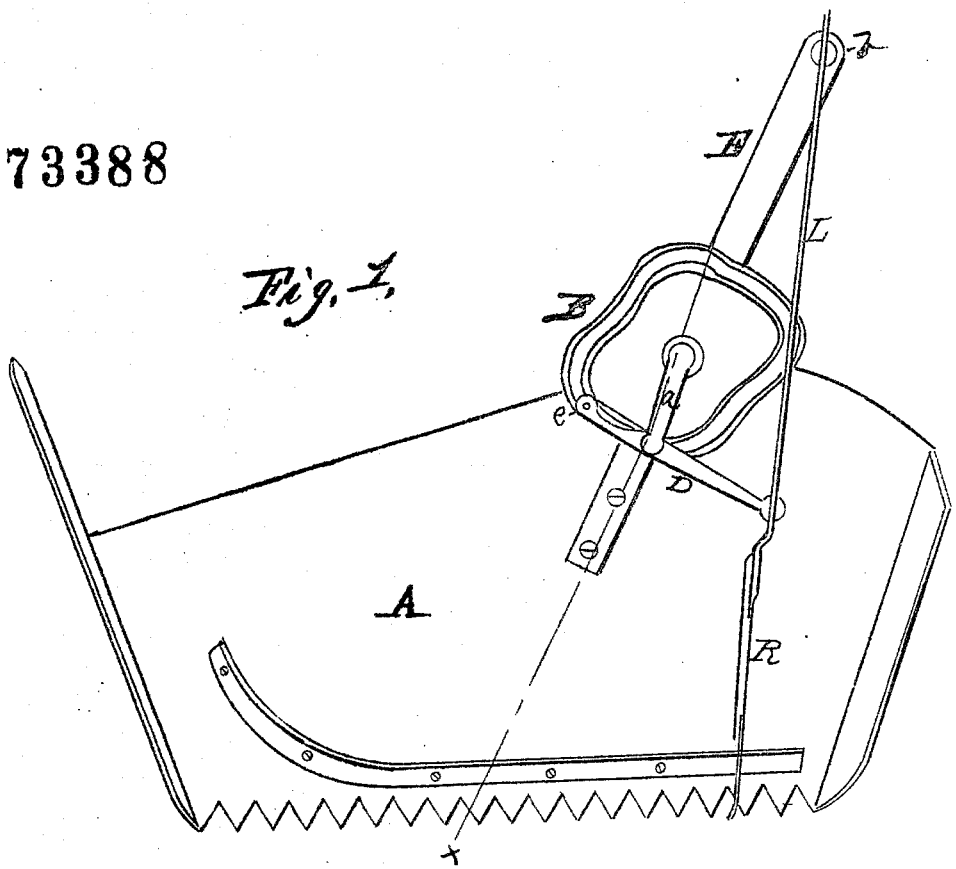
Figure 1 is a top plan view of a platform and rake, with my improvements applied thereto.
Figure 2:
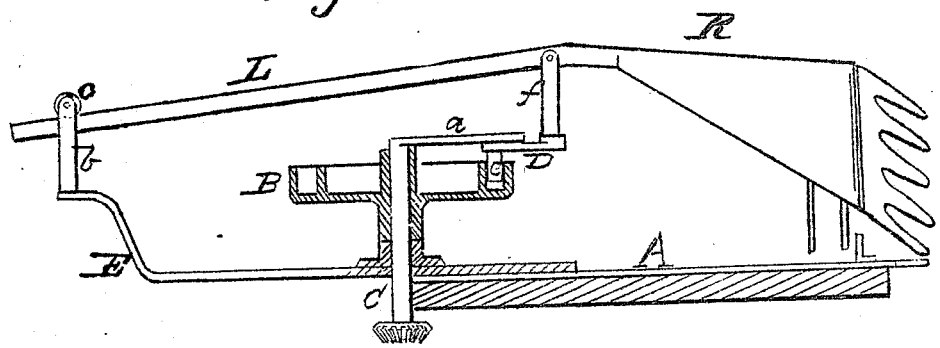
Figure 2 is a transverse section, taken on the line $x\ x$ of fig. 1.

I construct the platform A and the rake R as represented in the drawings, and to the rear end of the rake attach an arm or rod, L, which works in a slot in a post, $b$, pivoted on an arm, E, which arm is secured rigidly to and projects rearward from the platform A, as in my former patent, the construction and arrangement of these parts being the same as in the former case. Instead, however, of operating or guiding the rake by means of the sliding or compound arm and cam, as in the former case, I provide a cam of different form, as represented by B, which is bolted rigidly upon or above the platform, and has a shaft, C, extending vertically through its centre, as represented in fig. 2; this shaft being provided, at its lower end, below the platform, with a bevel-gear wheel, by which motion is imparted to the rake, by being suitably connected to the driving-wheel of the machine, as in the former case. At the upper end this shaft C terminates in, or has attached to it, a horizontal arm, $a$, which extends outward, to near the edge of the cam B, more or less, and is there pivoted centrally to another arm or rod, D, as represented in fig. 1. At its outer end this arm D has pivoted to it an upright post, $f$, in the upper end of which is pivoted, by a horizontal pin, the rake-arm or rod L, and at its opposite end the arm D has a pin or stud, $e$, projecting downward into the groove on the face of the cam B, as represented in fig. 2; this pin or stud $e$ having a friction-roller on it, or not, as may be desired. It will be apparent that when thus constructed and arranged, the movements of the rake R will be guided and controlled by the motions of the arm D, which is, in turn, controlled by the form of the cam-track in which the stud $e$ travels, the latter being carried around therein by the rotation of the arm $a$ of shaft C. By these means I impart to the rake the desired motions, and avoid the friction and tendency to bind, of the sliding arm used in my former invention.

Having thus described my invention, what I claim, is—

1. Operating a harvester-rake by means of a cam of suitable form, in combination with a rotating arm and lever, or their equivalents, substantially as described.

2. The combination of the rotating arm $a$, rod D, and rake R, with the cam B, when constructed and arranged to operate substantially as and for the purpose set forth.

SAM'L C. RIDGAWAY.

Witnesses:
H. B. MUNN,
P. T. DODGE.